(12) United States Patent  
Kelty et al.

(10) Patent No.: US 8,907,629 B2  
(45) Date of Patent: *Dec. 9, 2014

(54) ELECTRIC VEHICLE BATTERY LIFETIME OPTIMIZATION OPERATIONAL MODE

(75) Inventors: Kurt Russell Kelty, Palo Alto, CA (US); Weston Arthur Hermann, Palo Alto, CA (US); Scott Ira Kohn, Redwood City, CA (US); Clay Hajime Kishiyama, San Mateo, CA (US); Vineet Haresh Mehta, San Francisco, CA (US); Sarah G. Stewart, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 446 days.

This patent is subject to a terminal disclaimer.

(21) Appl. No.: 13/406,773

(22) Filed: Feb. 28, 2012

(65) Prior Publication Data

US 2013/0221916 A1 Aug. 29, 2013

(51) Int. Cl.
*H01M 10/46* (2006.01)

(52) U.S. Cl.
USPC .......................................................... 320/132

(58) Field of Classification Search
USPC .................................. 320/109, 132, 149, 150
See application file for complete search history.

(56) References Cited

U.S. PATENT DOCUMENTS

| | | | |
|---|---|---|---|
| 4,308,493 A | 12/1981 | Kothe et al. | |
| 5,872,453 A | 2/1999 | Shimoyama et al. | |
| 5,939,864 A | 8/1999 | Lenhart et al. | |
| 6,011,380 A | 1/2000 | Paryani et al. | |
| 6,188,202 B1 | 2/2001 | Yagi et al. | |
| 6,215,281 B1 | 4/2001 | Koch | |
| 6,904,342 B2 | 6/2005 | Hanada et al. | |
| 7,193,392 B2 * | 3/2007 | King et al. | 320/118 |
| 7,622,897 B2 | 11/2009 | Eberhard et al. | |
| 7,629,772 B2 | 12/2009 | Eberhard et al. | |
| 7,629,773 B2 | 12/2009 | Eberhard et al. | |
| 7,671,567 B2 | 3/2010 | Eberhard et al. | |
| 7,698,078 B2 | 4/2010 | Kelty et al. | |
| 7,789,176 B2 | 9/2010 | Zhou | |
| 8,063,609 B2 * | 11/2011 | Salasoo et al. | 320/134 |
| 8,336,319 B2 | 12/2012 | Johnston et al. | |
| 2003/0087148 A1 | 5/2003 | Minamiura | |
| 2010/0072954 A1 | 3/2010 | Kohn et al. | |
| 2010/0138178 A1 | 6/2010 | Paryani et al. | |
| 2010/0212339 A1 | 8/2010 | Kelty et al. | |

* cited by examiner

*Primary Examiner* — Edward Tso

(74) *Attorney, Agent, or Firm* — J. Richard Soderberg

(57) ABSTRACT

A multi-mode operating system for an electric vehicle is provided, the system including means for a user to select a preferred mode of operation from a plurality of operational modes that include at least a Battery Life mode and a Standard mode, wherein the Battery Life mode is configured to select operating and charging parameters that emphasize battery health and battery life over vehicle range and/or vehicle performance. The system includes a thermal management system for maintaining the vehicle's battery pack to within any of a plurality of temperature ranges, and a charging system for charging the vehicle's battery pack to any of a plurality of minimum and maximum SOC levels and at any of a plurality of charging rates.

20 Claims, 8 Drawing Sheets

ELECTRIC VEHICLE BATTERY LIFETIME OPTIMIZATION OPERATIONAL MODE

FIELD OF THE INVENTION

The present invention relates generally to batteries and, more particularly, to an electric vehicle operational mode that extends the life of the cells within the vehicle's battery pack.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery.

Although rechargeable batteries provide a much longer service life than disposable batteries, their service life is not unlimited. Depending upon the type of battery, a rechargeable battery can typically be recharged anywhere from 100 times (e.g., alkaline) to 1000 times (e.g., lithium-ion, lithium-polymer) to 20,000 times or more (e.g., thin film lithium). In addition to depending upon the type of battery chemistry involved, the number of cycles that a rechargeable battery can be recharged depends on a variety of other factors that include; (i) the rate of charging (i.e., slow trickle charge versus fast charge), (ii) the level of charging (i.e., 75% of full charge, full charge, over-charged, etc.), (iii) the level of discharge prior to charging (i.e., completely depleted, still charged to a low level, etc.), (iv) the storage temperature of the battery during non-use, and (v) the temperature of the battery during use.

Due to the high initial cost of rechargeable batteries, expensive products such as laptop computers often incorporate relatively sophisticated power management systems, thereby extending battery life and allowing the use of smaller, lower capacity batteries and/or batteries that utilize less expensive cell chemistries. One of the most common power management techniques is to place certain laptop components and peripherals, especially those that require relatively high levels of power to function, into either a standby mode or a low power usage mode whenever possible. Thus, for example, a laptop may provide two different video screen brightness levels; high brightness when the computer is plugged in, and low brightness when the computer is operating on battery power. This is also the primary purpose behind powering down the video screen when the computer is inactive for more than a short period of time or placing wireless connectivity capabilities (e.g., Bluetooth, WiFi, WAN, etc.) or other non-essential peripherals in standby mode when they are not required.

A growing application for rechargeable batteries is that of electric vehicles. All-electric and hybrid vehicles, however, present a number of engineering challenges, primarily due to the need for the rechargeable battery pack of such a vehicle to meet the consumers' expectations relative to performance, range, reliability, lifetime and cost. The present invention provides a battery pack management system that helps achieve these goals.

SUMMARY OF THE INVENTION

A multi-mode operating system for an electric vehicle is provided, the system including means for a user to select a preferred mode of operation from a plurality of operational modes that include at least a Battery Life mode and a Standard mode, wherein the Battery Life mode is configured to select operating and charging parameters that emphasize battery health and battery life over vehicle range and/or vehicle performance. The system includes a thermal management system for maintaining the vehicle's battery pack to within any of a plurality of temperature ranges, and a charging system for charging the vehicle's battery pack to any of a plurality of minimum and maximum SOC levels and at any of a plurality of charging rates.

In at least one embodiment, when the Battery Life mode is selected the system utilizes a maximum SOC level (e.g., 60% or less) during charging that is at least 10% lower than the maximum SOC level used when the Standard mode is selected; utilizes a maximum charging rate (e.g., C/20 or less) that is lower than the charging rate used when the Standard mode is selected; and utilizes a maximum discharge rate (e.g., 1 C or less) that is lower than the maximum discharge rate used when the Standard mode is selected.

In at least one embodiment, when the Battery Life mode is selected the system utilizes a minimum SOC level during charging that is at least 5% higher than the minimum SOC level used when the Standard mode is selected; alternately, at least 15% higher than the minimum SOC level used when the Standard mode is selected.

In at least one embodiment, when the Battery Life mode is selected the system utilizes a minimum loaded voltage set to a preset level of approximately 3.0 volts.

In at least one embodiment, during discharge the thermal management system maintains the battery pack to a temperature within a first range of temperatures (e.g., 25° C. to 30° C.) when the Battery Life mode is selected, and within a second range of temperatures (e.g., 30° C. to 35° C.) when the Standard mode is selected.

In at least one embodiment, the maximum charge rate utilized when the Battery Life mode is selected depends on battery pack temperature, wherein the maximum charge rate is preset at C/20 or less if the battery pack temperature is above 10° C., and preset at C/50 or less if the battery pack temperature is below 10° C.

In at least one embodiment, during discharge the thermal management system maintains the thermal balance between cells within a first preset limit (e.g., 5° C.) when the Battery Life mode is selected, and within a second preset limit (e.g., 10° C.) that is greater than the first preset limit when the Standard mode is selected.

In at least one embodiment, during an extended charging cycle the charging system allows the battery pack to self-discharge to a first minimum SOC level prior to re-initiating charging when the Battery Life mode is selected, and to a second minimum SOC level prior to re-initiating charging when the Standard mode is selected, where the first minimum SOC level is at least 25% less than the second minimum SOC level. The first minimum SOC level is preferably at least 30% less than the first maximum SOC level.

The means provided for the user to select the preferred mode of operation may utilize a touch screen, a plurality of switching means (e.g., push-buttons, toggle switches, rotating switches and slide switches) with or without a display, a voice recognition system, an RF remote mode selector, and a remote mode selector communicating with a vehicle communication interface over a network (e.g., internet).

In at least one embodiment, the system includes a mode indicator that indicates to the vehicle's driver which mode has been selected.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

FIGS. 1-5 illustrate several battery characteristics for an exemplary battery pack. It should be understood that different battery packs, for example those using a different cell chemistry, will exhibit different profiles than those shown in FIGS. 1-5, and that these figures are only meant to illustrate some of the issues involved with a typical rechargeable battery.

Figure 1:
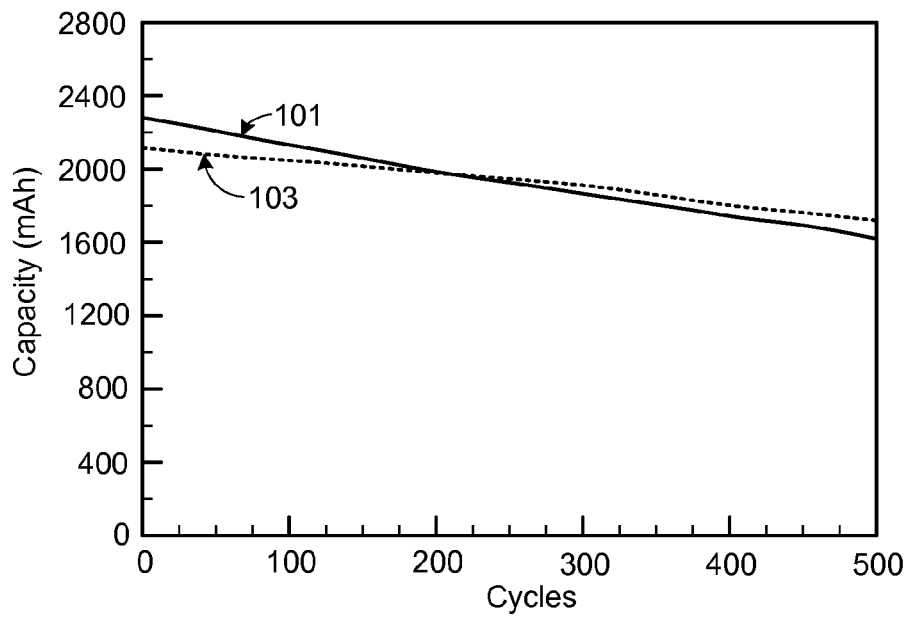
FIG. 1 graphically illustrates the effects of charging cut-off voltage on battery life.

FIG. 1 is a graph that illustrates the effects of charging cut-off voltage on battery life, the cut-off voltage being the voltage at which charging is terminated. Utilizing a cut-off voltage of 4.15 volts (curve 101), initially the battery pack achieves a higher capacity than that obtained using a charge cut-off voltage of 4.10 volts (curve 103). After approximately 200 charging cycles, however, the capacity of the battery using the lower charge cut-off voltage is greater than that of the battery using the higher charge cut-off voltage, illustrating that the useful lifetime of a battery pack can be dramatically extended by simply lowering charge cut-off voltage. Unfortunately lowering the charge cut-off voltage has consequences to other aspects of the battery pack's performance, in particular capacity, since a battery charged to a higher voltage exhibits a greater capacity than the same battery charged to a lower voltage.

Figure 2:
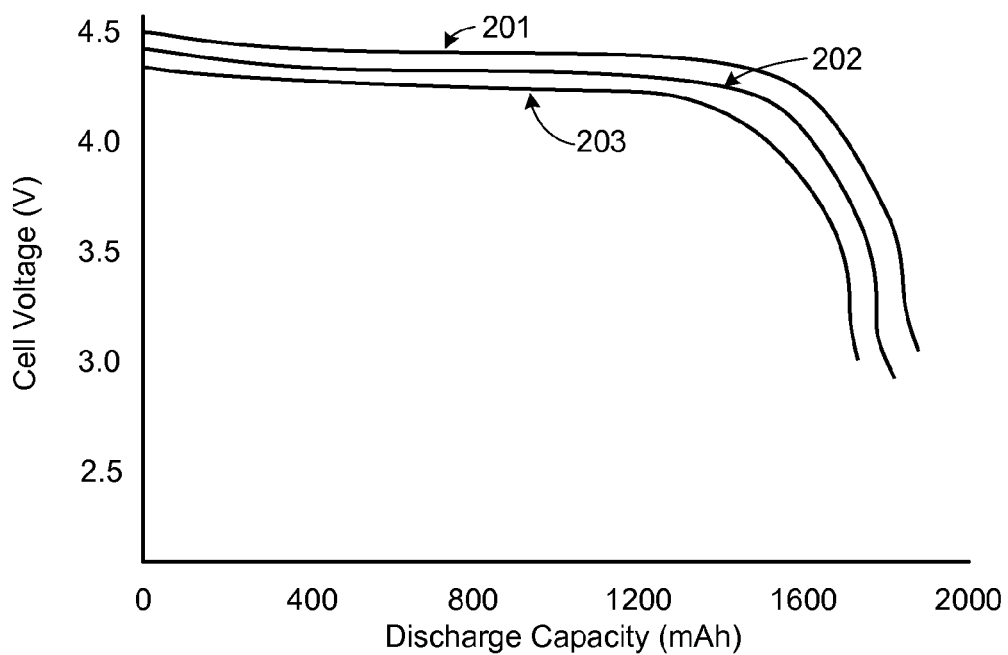
FIG. 2 graphically illustrates the effects of temperature on cell voltage and discharge capacity.

FIG. 2 is a graph illustrating the effects of temperature on the cell voltage and discharge capacity of an exemplary battery. In the figure, curve 201 corresponds to a temperature of 40° C., curve 202 corresponds to a temperature of 30° C., and curve 203 corresponds to a temperature of 20° C. As illustrated, an increase in operating temperature from 20° C. to 40° C. dramatically improves discharge capacity which, in turn, can lead to both improved vehicle performance (e.g., faster acceleration) and improved driving range for an electric vehicle using such a battery pack due to the lower impedance. A drawback, however, of operating at a higher temperature is the effect such a temperature has on battery life, specifically shortening the battery's cycle life.

Figure 3:
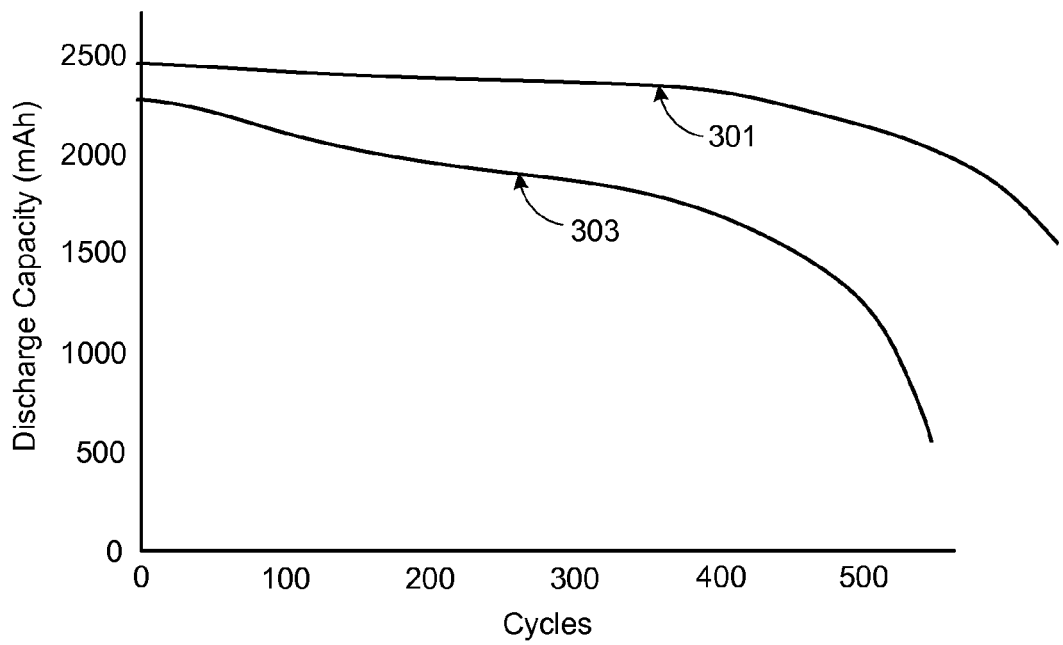
FIG. 3 graphically illustrates cycle life degradation at different temperatures.
Figure 4:
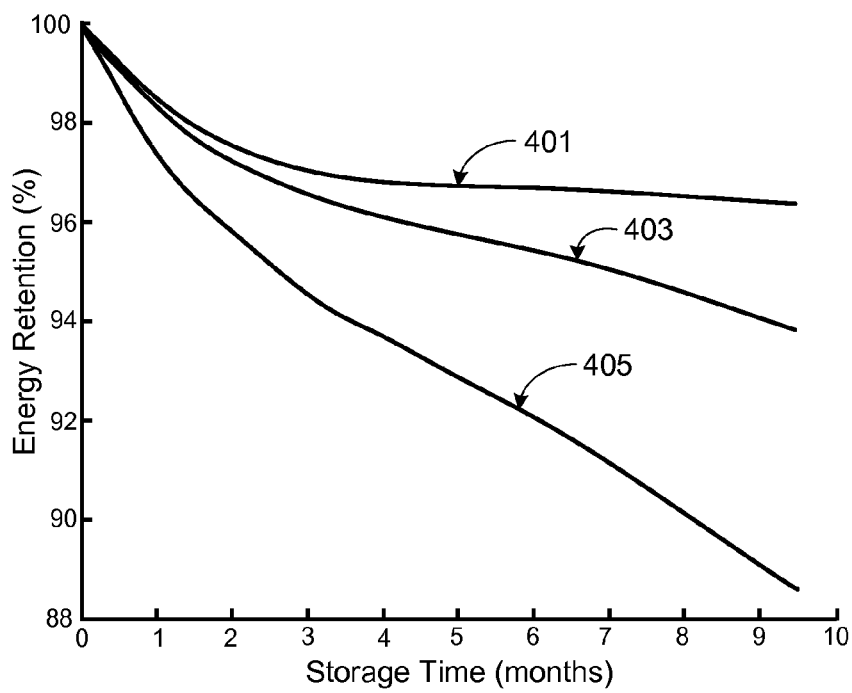
FIG. 4 graphically illustrates non-recoverable capacity loss due to storage at high temperatures.

FIG. 3 illustrates the effects of temperature on cycle life degradation. In this figure curve 301 corresponds to a battery pack cycled at 35° C. while curve 303 corresponds to a battery pack cycled at 55° C. As shown, by decreasing the storage temperature of a battery, it is able to retain a much higher capacity over a longer cycle life. FIG. 4 illustrates the effects of temperature on energy retention for cells in storage, the data taken for cells at a relatively high SOC (i.e., 4.2 volts). Curve 401 corresponds to 20° C.; curve 403 corresponds to 40° C.; and curve 405 corresponds to 55° C. Note the dramatic decrease as the storage temperature is raised from 40° C. to 55° C.

Figure 5:
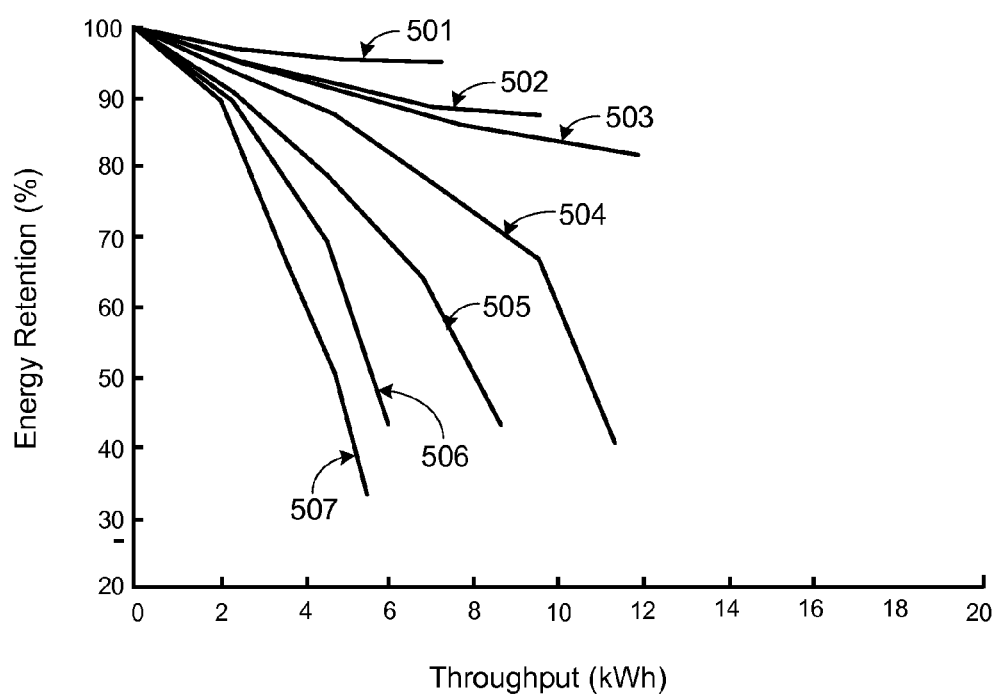
FIG. 5 graphically illustrates the effects of depth-of-discharge on battery life.

There are many other battery characteristics that must be taken into account during the design of the drive system, battery pack and attendant charging system of an all-electric or hybrid vehicle. For example, the depth of discharge which the system allows, or that the system is designed to accommodate, will affect a battery's life. For most battery chemistries, frequently discharging the battery more than 70 to 80 percent of rated capacity will lead to decreases in battery life. This battery characteristic is shown in FIG. 5 which also shows that discharges of only 20-30 percent will extend battery life. In particular, curve 501 corresponds to depth of discharge (DoD) of 10%; curve 502 corresponds to DoD of 20%; curve 503 corresponds to DoD of 30%; curve 504 corresponds to DoD of 40%; curve 505 corresponds to DoD of 50%; curve 506 corresponds to DoD of 70%; and curve 507 corresponds to DoD of 100%.

Figure 6:
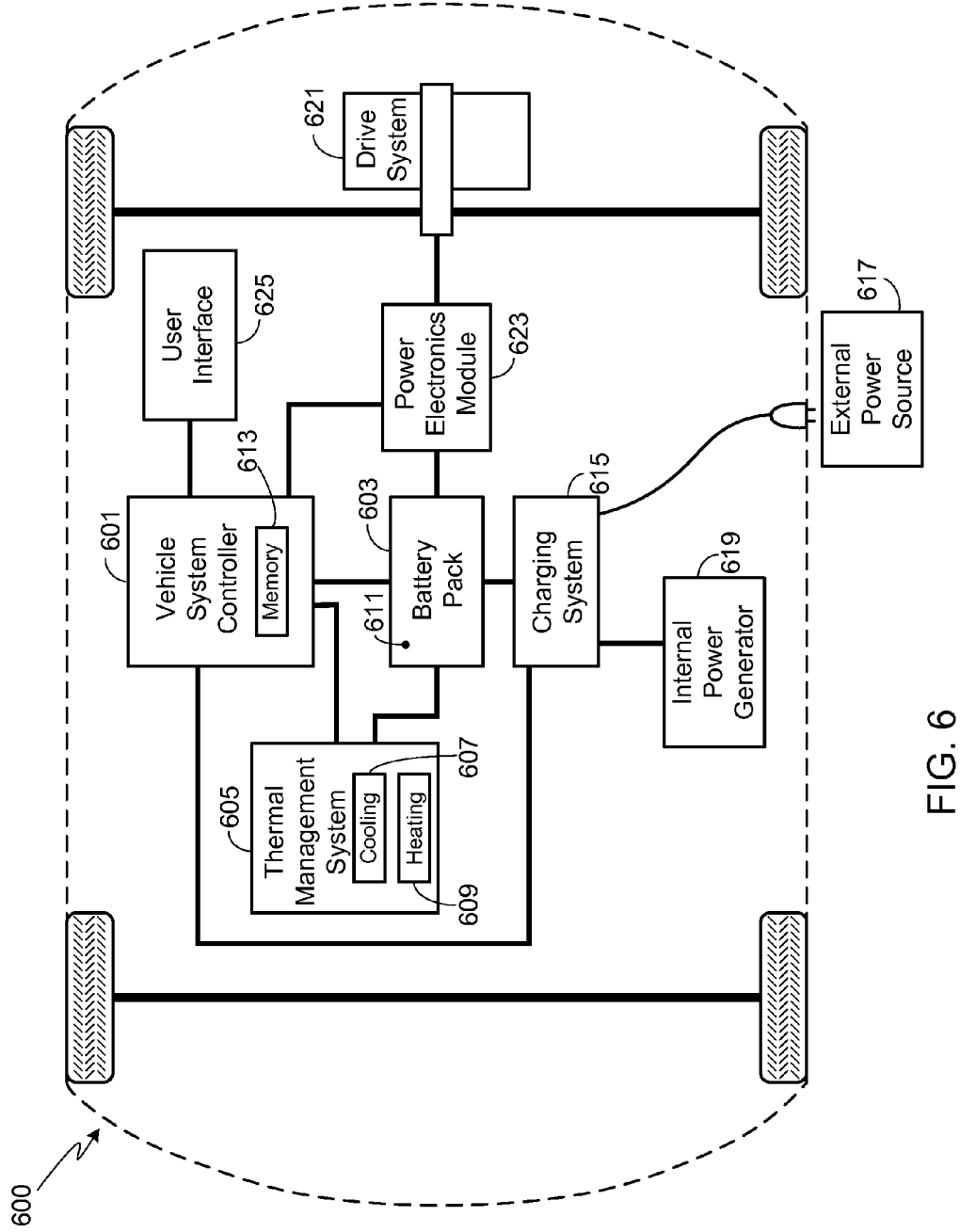
FIG. 6 provides a system level diagram of the primary vehicle systems impacted and/or utilized by a battery pack system in accordance with the invention.

FIG. 6 is a high-level view of a vehicle 600 and the primary vehicle subsystems utilized and/or impacted by a vehicle control system designed to allow the user to select a battery lifetime optimization operational mode for the vehicle in accordance with the invention. It will be appreciated that vehicle 600 can utilize other subsystem configurations while still retaining the multi-operational mode capabilities of the present invention. As shown, vehicle 600 includes a vehicle control system 601 that monitors and controls the general operation of the various vehicle subsystems. System controller 601 is coupled to battery pack 603 and thermal management system 605. Thermal management system 605, which preferably includes both a cooling subsystem 607 and a heating subsystem 609, is used to control battery pack temperature and is preferably coupled to other vehicle thermal systems, e.g., drive train cooling, passenger cabin HVAC system, etc., for example as disclosed in co-assigned U.S. Pat. No. 7,789,176, and co-assigned and U.S. Patent Application No. 12/835,486, filed 13 Jul. 2010, now U.S. Pat No. 8,336,319, the disclosures of which are incorporated by reference for any and all purposes. As described in further detail below, controller 601 preferably monitors the temperature of the cells within battery pack 603 using one or more sensors 611 and controls the temperature of the battery pack using thermal management system 605 in order to achieve the desired battery pack operating and/or storage temperature.

In addition to monitoring battery pack temperature, vehicle control system 601 also monitors the state of charge (SOC) of battery pack 603 as well as the rate of battery discharge, both during vehicle operation and vehicle storage. In addition, in at least one embodiment system 601 monitors and stores in on-board memory 613 the number of charging cycles to which the battery has been subjected. Preferably for each charging cycle the cut-off voltage and other charging parameters are monitored and stored in memory 613, thereby providing information that can be used to gauge the relative health of battery pack 603 throughout its expected lifetime.

Control system 601 is coupled to a charging system 615 that controls and monitors cut-off voltage during charging. Charging system 615 may also control and monitor the charge rate. Charging system 615 may either be an external system or integrated within vehicle control system 601. In at least one embodiment, charging system 615 is external to both the control system 601 and vehicle 600. In such an embodiment, preferably the portion of the charging module that converts external power to a power level (e.g., voltage) that is compatible with battery pack 603 is external to the vehicle while a second portion of the charging module that controls charging characteristics such as cut-off voltage, charging rate, etc. is internal to the vehicle. Alternately, the entire charging module can be external to the power control subsystem 601 and the vehicle.

In at least one preferred embodiment, battery pack 603 is configured to be plugged into, or otherwise connected to, an external power source 617 via charging system 615. A municipal power grid is one example of an external power source 617. Charging system 615 insures that the power from source 617 is converted to a form of power storable by battery pack 603. For example, charging system 615 typically includes an AC to DC rectifier in order to convert power from the power source to that required by battery pack 603. In at least one embodiment, battery pack 603 is charged in whole or in part by a power generator 619 that is contained within the vehicle, i.e., an on-board power generator, which is coupled to the battery pack via charging system 615. It will be appreciated that in some embodiments, while external power source 617 is preferred for providing a full charge to battery pack 603, internal power source 619 can be used to augment the charge within the battery pack, for example by charging battery pack 603 during vehicle use, thereby extending driving range. In at least one embodiment, internal power source 619 is a regenerative braking system.

Power control subsystem 601 also controls the power coupled from battery pack 603 to vehicle propulsion motor 621, for example using a power electronics module (PEM) 623. Power electronics module 623 is used to insure that the power delivered to motor 621 has the desired voltage, current, waveform, etc. Thus, for example, PEM 623 preferably includes a DC to AC inverter, as well as the necessary control circuitry/processor to implement the various selectable modes as described in detail below. It will be appreciated that vehicle propulsion motor 621 can be comprised of a single electric motor or multiple electric motors.

User interface 625 is preferably integrated into the vehicle's user interface, although interface 625 can be implemented in other ways as described in detail below. Interface 625 provides a means for the user to control the selection of the vehicle's operational mode as well as associated parameters. Preferably interface 625 also provides means for identifying which mode the vehicle is in at any given time, as described further below.

Vehicle Operational Modes

Conventional hybrid vehicles typically offer either two or three hybrid operational modes, i.e., modes in which the vehicle utilizes both the electric motor and the combustion engine. If only two hybrid modes are offered, typically the two modes are Economy and Power, the Economy mode designed to enhance the fuel efficiency of the drive train, specifically increasing the miles per gallon of gasoline, while the Power mode delivers maximum performance. If a third mode is offered, typically it is a Normal mode in which the control system delivers performance and fuel efficiency that is somewhere between that provided in the Economy and Power modes. Note that many conventional hybrid vehicles may also provide a full EV mode in which all propulsive power is provided by the electric motor, although a typical hybrid can only drive a short distance in the EV mode, often with a dramatic reduction in both allowable acceleration and top speed.

While a number of different approaches may be taken to achieve higher fuel efficiency in the Economy mode of a hybrid vehicle, typically in this mode the vehicle control system will limit throttle response, thus achieving more fuel efficient acceleration. The control system may also switch the passenger cabin climate control system to an energy-saving mode, for example a mode that modifies the load placed on the engine by the air-conditioning system, as well as tuning the various electric system to reduce energy draw. Another technique that is often used to increase fuel efficiency is to shift the transmission into a higher gear at lower rpms and/or lock the transmission's torque converter at low speeds. Lastly, in some vehicles the Economy mode provides feedback to the driver in order to instigate more economical driving habits, for example vibrating or increasing throttle pedal resistance if the control system determines that the driver is attempting to accelerate above a preset rate.

As EVs only utilize an electric motor, or multiple electric motors, for propulsive power, the various operational modes of an EV typically operate quite differently than the modes in a hybrid vehicle. U.S. Pat. No. 7,671,567 describes four different modes for an EV, as well as their effects on performance, range and battery life. The four described modes are standard, storage, extended driving range, and performance. Details for each are provided below.

Standard Mode—In the Standard Mode, the system is configured to provide the optimal compromise between performance, driving range and battery life. In general, the Standard Mode limits the cut-off voltage during charging to approximately 70%-95% of the rated capacity. Typically the Standard Mode maintains the battery pack at a relatively cool temperature during both vehicle operation (i.e., driving) and when plugged in, for example cooling the battery pack to a temperature within the range of approximately 30° C. to 35° C. during vehicle operation, and within the range of approximately 20° C. to 25° C. when the vehicle is plugged in to the external power source.

Storage Mode—The Storage Mode is configured to optimize battery life when the vehicle is stored for an extended period of time, for example, for a period of time greater than 2 or 3 weeks. In this mode, the cut-off voltage during charging is limited to approximately 30%-70%, and more preferably to approximately 30%-50%. As in the Standard Mode, the battery pack temperature is maintained at a relatively cool temperature, preferably in the range of approximately 20° C. to 25° C. when the charging system is coupled to an external power source. In such configurations/vehicles, once the Storage Mode is selected, and assuming that the vehicle is plugged in rather than operating and that the battery pack's state of charge is greater than a preset value (e.g., 50%), the system actively lowers the charge state to the preset value, thereby helping to prolong battery life. In such a configuration, the system may actively lower the charge state by subjecting the battery pack to a load (e.g., turning on the lights or a fan or applying a dummy load).

Extended Driving Range Mode—This mode optimizes the system in order to achieve the maximum driving range, i.e., distance. During vehicle operation, the battery is kept relatively warm, thereby decreasing battery impedance and achieving greater discharge capacity. If the Extended Driving Range Mode is selected and the vehicle is plugged into an external power source, typically the battery pack is cooled to a lower temperature than normal and the maximum cut-off voltage is used, i.e., approximately 90%-100% of the rated capacity.

Performance Mode—This mode is intended to achieve the best vehicle performance available, at the cost of both battery life and range. Therefore in this mode the maximum cut-off voltage is used during charging, i.e., approximately 90%-100%. Additionally, typically during vehicle operation the battery pack temperature is maintained at a higher temperature than normal, e.g., within the range of approximately 37° C. to 40° C. Battery pack during charging is also maintained at a temperature that is higher than normal, e.g., within the range of approximately 35° C. to 40° C.

In the Performance Mode, the control system may also take other actions to achieve superior performance, for example providing a temporary increase in the available current that can be supplied to motor 621.

In addition to the exemplary changes noted above that may be made based on the selected operational mode, the controller may also be configured to impact the charging profile, assuming the vehicle has some form of an internal power generator 619 (e.g., regenerative braking system, solar panels, etc.). In such a system, the state of charge of the battery pack may be monitored and maintained within a predefined range using the charging capabilities provided by the internal power generator. For example, in the Standard Mode an average charge of approximately 50% may be maintained; in the Storage Mode an average charge of 30-50% may be maintained; and in the Extended Range and the Performance Modes an average charge of approximately 70% may be maintained.

Optimal Battery Life Mode

Each of the operational modes described above is intended to respond to a specific user concern or desire for a particular vehicle. For example, the Economy mode attempts to achieve the best possible fuel economy; the Extended Range mode attempts to achieve the longest driving distance, thereby helping to alleviate range anxiety; and the Performance Mode strives to provide the best possible performance, i.e., acceleration and top speed. None of these modes, however, overcomes the anxiety of electric vehicle owners or the fear of potential buyers that they will have to replace the battery pack in their vehicle sooner than expected, or that they are potentially harming the battery pack and its lifetime through their manner of operating or charging their car. Accordingly, the present invention overcomes these concerns by providing an operational mode that maximizes battery life, even if that choice limits driving range, fuel economy and/or performance.

In accordance with the invention, the user of an electric vehicle 600 is able to select an Optimal Battery Life mode utilizing user interface 625. Both pure electric vehicles, i.e., EVs, and hybrid vehicles may be configured to provide such an operational mode. Once selected, vehicle system controller 601 sets a number of operational parameters of the vehicle in accordance with preset values for each of the operational parameters. Preferably the preset values are set by the vehicle's manufacturer, although the system may also be configured to allow vehicle dealers, third parties (e.g., repair shops), and/or the vehicle's owner to set and/or adjust the preset values.

The parameters set through selection of the Optimal Battery Life mode will vary depending upon the specifics of the vehicle in question, for example, battery chemistry, thermal control system capabilities, charging system configuration, etc. In general, however, the system will control one or more of the following parameters. It should be understood that the recommended preset values for each of the exemplary parameters assumes a certain type of battery, e.g., lithium ion battery chemistry, and therefore other preset values may be used for other systems.

SOC—The minimum and maximum SOC levels are preferably set when the system is operating in the Optimal Battery Life mode. In an exemplary embodiment, a minimum SOC level of 15% and a maximum SOC level of 60% are set by selection of this mode. Typically the minimum SOC level in this mode is set at a value that is at least 5% higher than the minimum SOC level set in the Standard Mode, and the maximum SOC level in this mode is set at a value that is at least 10% lower than the maximum SOC level set in the Standard Mode.

Minimum Loaded Voltage—In at least one embodiment of the invention, when the Optimal Battery Life mode is selected, a minimum loaded voltage is set for the cells within battery pack 603. For example, in one configuration the minimum loaded voltage is set to a preset value of 3.0 volts.

Battery Temperature During Discharge—Another parameter that may be set when the Optimal Battery Life mode is selected is the battery temperature during discharge (i.e., vehicle operation). For example, in at least one embodiment the battery pack is maintained within a temperature range of approximately 30° C. to 35° C. during discharge; alternately, to a temperature within the range of approximately 25° C. to 30° C. during discharge.

Battery Temperature During Charging—In addition to setting discharge temperatures, preferably when the Optimal Battery Life mode is selected the system also sets the battery temperature to be maintained during charging, the temperature selected to minimize degradation during charging. In at least one embodiment, the preset temperature for this mode of operation is within the range of 35° C. to 40° C. It will be appreciated that in a typical scenario, battery heating (for example using heating system 609) will be required in order to raise the temperature of the battery pack to the preset charging temperature.

Battery Temperature During Storage—In addition to setting charge and discharge temperatures, preferably when the Optimal Battery Life mode is selected the system also sets the battery temperature to be maintained during storage. In at least one embodiment, during storage the battery pack is maintained at a temperature within the range of approximately 15° C. to 20° C.; alternately, to a temperature within the range of approximately 20° C. to 25° C.

SOC During Storage—As noted above, preferably the minimum and maximum SOC levels are set when the system is operating in the Optimal Battery Life mode. An additional SOC level may be set in this mode when the vehicle enters into periods of storage. Typically storage periods are set by the user, for example via user interface 625. Storage periods may be set on a one-by-one basis, or as a series of events (e.g., every week from 11:00 PM Friday through 11:00 PM Sunday. In at least one embodiment, the maximum SOC level during storage is set at 50% SOC; alternately, to a level of 40% SOC; alternately, to a level of 30% SOC. Preferably if the Optimal Battery Life mode includes this parameter, system controller 601 also includes means for insuring that the battery is charged to a higher SOC (e.g., 60%) prior to vehicle use. For example, in at least one configuration the user is able to set, via user interface 625, an intended drive time (e.g., day/date and time). Controller 601 then charges battery pack 603 to the higher SOC level (e.g., 60%) immediately prior to this day/date and time so that the vehicle is charged to the highest level allowed by the selected operational mode prior to its use.

Maximum Charge Rate—Preferably if the Optimal Battery Life mode is selected, the system sets the maximum allowable charge rate to a relatively low rate, thus maximizing battery health. In an exemplary configuration, the maximum allowable charge rate is set to C/20.

Maximum Charge Rate as a Function of Temperature—In addition to simply setting the maximum charge rate, the system may also be configured to set the maximum allowable charge rate as a function of battery temperature. For example, in one configuration a maximum allowable charge rate of C/20 or less is set if the battery is within a temperature range of 20° C. to 25° C.; a maximum allowable charge rate of C/30 or less is set if the battery is within a temperature range of 15° C. to 20° C.; a maximum allowable charge rate of C/40 or less is set if the battery is within a temperature range of 10° C. to 15° C.; and a maximum allowable charge rate of C/50 or less is set if the battery is at a temperature of 10° C. or less. In an alternate example, a maximum allowable charge rate of C/20 or less is set if the battery temperature is higher than 10° C., and to a maximum allowable charge rate of C/50 or less if the battery temperature is lower than 10° C.

Maximum Charge Rate as a Function of Charging Time—In addition to simply setting the maximum charge rate or setting the charge rate as a function of battery temperature, the system may also be configured to set the maximum allowable charge rate as a function of allowed charging time. In general, in this configuration the user inputs information that the system controller 601 can use to determine the allowable charging time. After determining the allowable charging time, controller 601 determines the charge rate necessary to charge the battery pack to the maximum allowed SOC, preferably preset when the Optimal Battery Life mode is selected, within the allowed time. The information input by the user may be the next expected drive time (e.g., day/date/time). Alternately, the information may be the allotted charging time (e.g., 8 hours).

Battery Pack Thermal Balance During Discharge—Preferably the thermal balance of the batteries within pack 603 during discharge is monitored and maintained within a preset limit. For example, while the thermal balance between cells of the pack during normal vehicle operation may be set to a level of less than 10° C., preferably when the Optimal Battery Life mode is selected a thermal balance of less than 5° C. is maintained.

Maximum Discharge Rate—Preferably if the Optimal Battery Life mode is selected, the system sets the maximum allowable discharge rate, this discharge rate being set to a value that is at, or above, the minimum rate necessary to provide the driver with sufficient power to drive safely. For example, for a particular vehicle/battery pack, a maximum discharge rate of between 1 C and 2 C may be allowed during normal operation, but that rate may be set at a maximum rate of 0.5 C when the Optimal Battery Life mode is selected. In this example, if the particular vehicle/battery pack requires that a discharge rate of at least 0.7 C be available to meet safe driving standards for that vehicle, then the maximum rate of 0.7 C, rather than 0.5 C, would be used as the preset maximum discharge rate when the Optimal Battery Life mode is selected.

Extended Charging—Occasionally a vehicle may be connected to the charging source (e.g., garage power socket) for an extended period of time, for example throughout the week/weekend or while the owner is traveling. In a conventional electric vehicle left in this situation, the charging system will typically maintain the battery at or near the preset SOC level, e.g., 90% SOC. In the present system when the Optimal Battery Life mode is selected, this parameter allows the battery to self-discharge to a much lower rate before re-initiating the charging cycle, thereby limiting the frequency that the battery is recharged when left coupled to the charging source. For example, in one configuration after the battery pack is charged to an upper preset value, e.g., 60% SOC, the battery is allowed to self-discharge to a lower preset value, e.g., 15% SOC, before recharging. Preferably the range between the upper and lower preset values is at least 20%; alternately, at least 30%; alternately, at least 40%. Preferably if this parameter is set in the Optimal Battery Life mode, the system is also configured to set the maximum charge rate as a function of allowed charging time as described above, thus insuring that the vehicle is charged to or near the upper preset value when the user wants to drive the vehicle, and that the charging rate used to achieve that SOC level does not exceed a preset charge rate.

Mode Selection

Figure 7:
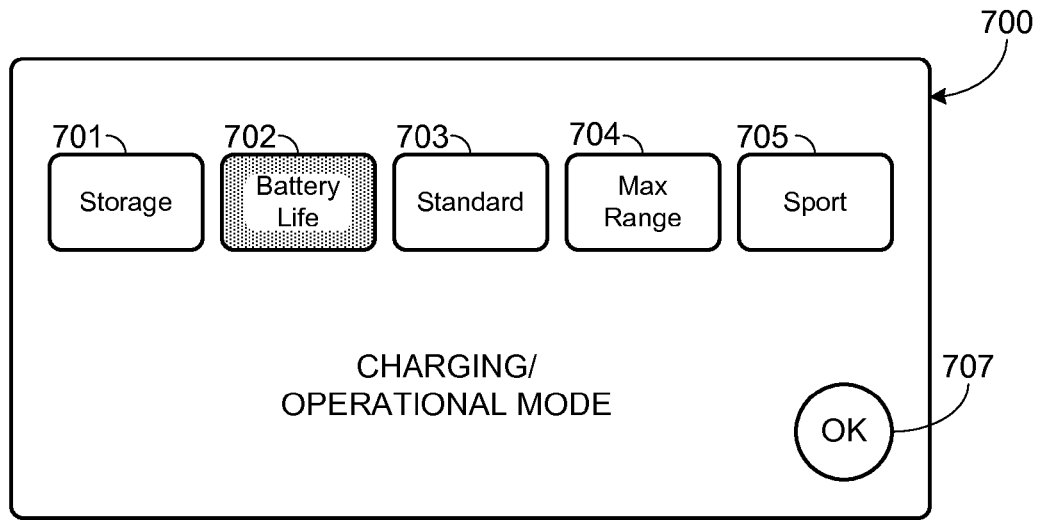
FIG. 7 illustrates a touch-sensitive display screen associated with one embodiment of a charging/operational mode selector.
Figure 8:
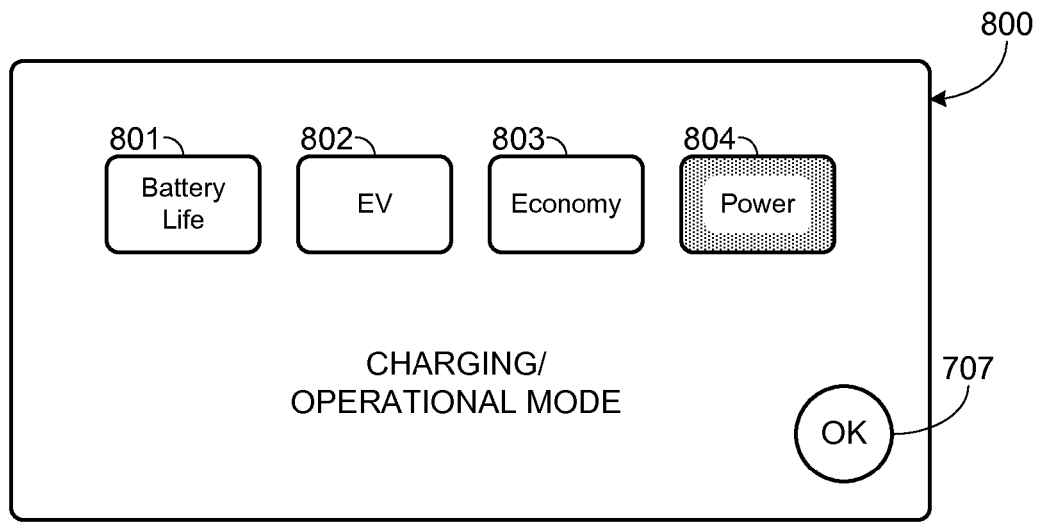
FIG. 8 illustrates a touch-sensitive display screen similar to that shown in FIG. 7, but utilizing a different set of modes.

The present invention can utilize any of a variety of charging/operational mode selection means. In a preferred embodiment, a display system is used, either alone with a touch-sensitive screen, or together with a plurality of switching means (e.g., toggle switches, push button switches, slide switches, etc.). For example, FIG. 7 illustrates a portion of a touch-sensitive touch screen 700 which includes a plurality of touch-sensitive buttons 701-705 that correspond to various available charging/operational modes. FIG. 8 illustrates a similar screen portion 800 that includes a different set of touch-sensitive buttons 801-804 that correspond to various charging/operational modes more likely to be found in a hybrid vehicle utilizing the Optimal Battery Life mode of the invention. The displays shown on screens 700 and 800 may be located on a dedicated screen. Alternately and as preferred, the displays shown on screens 700 and 800 may be one of a plurality of available displays (i.e., menus) that a user may access on the user interface (e.g., interface 625). In the preferred embodiment, in addition to the mode selector display, a variety of other menus/displays may be presented, e.g., vehicle performance, battery performance, battery SOC, available driving range, passenger cabin HVAC controls, audio entertainment controls, cell phone controls, navigation system controls, etc.

In screens 700 and 800, touching one of the buttons 701-705/801-804 causes the corresponding mode to be selected. Preferably the touched button is highlighted to indicate the selection. For example, button 702 is highlighted in FIG. 7 and button 804 is highlighted in FIG. 8. In an alternate embodiment, a mode selection button must be touched followed by pushing (i.e., touching) a data entry button 707. Requiring the selection of two buttons, i.e., the mode button and the entry button, decreases the risk of an inadvertent mode change. In an alternate embodiment that is intended to further reduce the risk of inadvertent or unauthorized mode changes, after selecting a mode, or after selecting a mode and touching the data entry button, a secondary mode selection screen is displayed (not shown) that requests a user personal identification number (PIN) or password.

Figure 9:
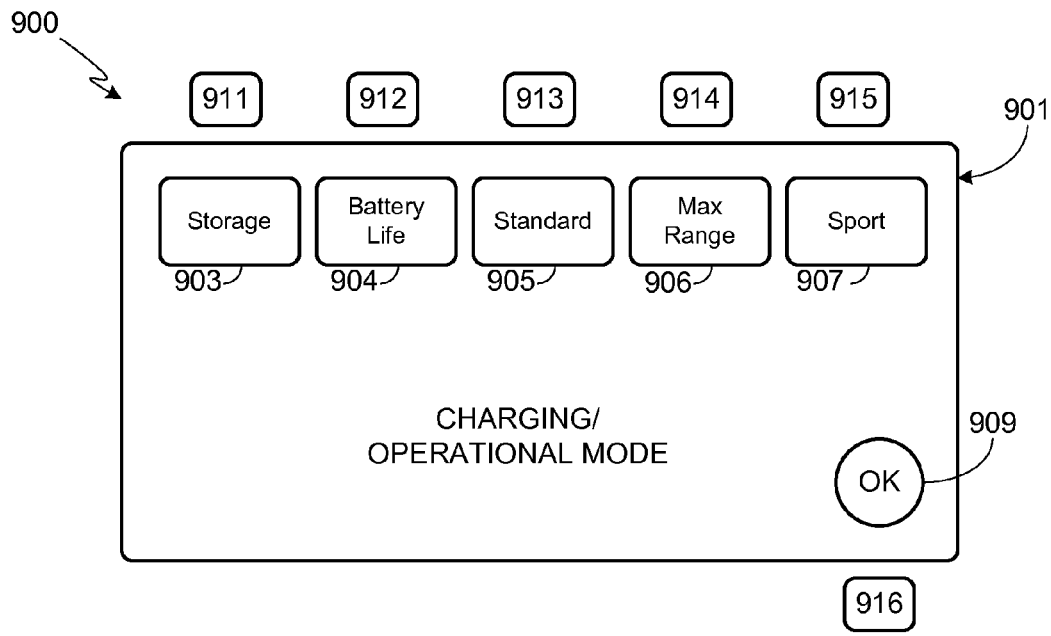
FIG. 9 illustrates a non-touch-sensitive display used in conjunction with other switching means in an alternate embodiment of a charging/operational mode selector with similar control functionality to that shown in FIG. 7.

As previously noted, the present invention is not limited to a single means for inputting the desired mode. For example, if a non-touch-sensitive display is used, preferably the screen is immediately adjacent to a plurality of buttons, toggle switches, or other switching means that are used in conjunction with the display to provide the selection means. FIG. 9 illustrates such a mode selector system 900 that includes the same functionality as provided by touch-screen 700. As shown, screen 901 is configured so that the possible modes 903-907 as well as other possible inputs (e.g., entry button 909) are immediately adjacent to hard buttons, or other switching means, 911-916. It will be appreciated that the hard buttons (e.g., buttons/switches 911-916) can be used to provide other data input simply by re-configuring the display and associating the hard switches 911-916 with other functions.

Figure 10:
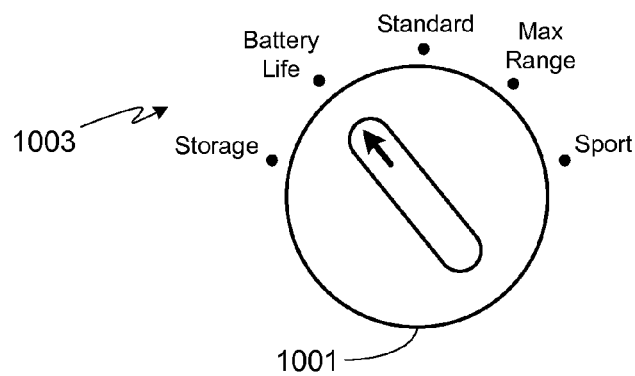
FIG. 10 illustrates a charging/operational mode selector with similar control functionality to that shown in FIG. 7 that does not require a display interface.

In addition to a charging/operational mode selector that uses a display screen, a simple non-display mode selector can also be used with the invention, for example a mode selector comprised solely of push buttons, toggle switches, slide switches, rotating switches, etc. Such a mode selector may be located within the passenger compartment (e.g., on the dash, on the console, etc.) or elsewhere (e.g., near the plug-in receptacle on the outside of the vehicle, preferably covered by a charging receptacle cover door). FIG. 10 illustrates one such charging/operational mode selector that does not require a display interface, rather it uses a rotating switch 1001. Indicators 1003 surround switch 1001, each of which indicates a particular charging/operational mode. In the illustration shown in FIG. 10, five charging/operational modes are shown with the Optimal Battery Life Mode, labeled "Battery Life", selected.

In another embodiment, the charging/operational mode selection means uses a voice recognition system such as those commonly used with on-board vehicle navigation systems. Preferably the voice recognition system uses a display interface as well, thus simplifying system/user interaction and providing the user with positive indicators when their voice inputs have been correctly accepted by the system.

Figure 11:
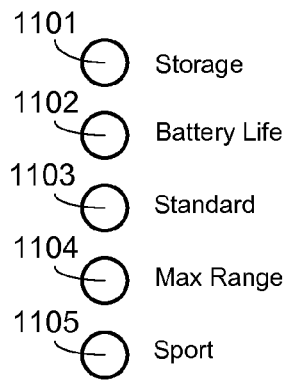
FIG. 11 illustrates a means for indicating the selected charging/operational mode.

Regardless of the selection means used, preferably the system includes one or more indicators that indicate the selected mode. Preferably the indicators are easily visible to insure that the user recognizes the selected mode. For example, five indicators can be located on the dashboard, easily visible to the driver, representing the five charging/operational modes illustrated in FIGS. 7, 9 and 10 (alternately, four indicators representing the four modes illustrated in FIG. 8). Preferably next to each indicator is either a textual indicator of the mode, as shown in FIG. 11, or a symbolic indicator of the mode. In at least one embodiment, the indicators are also color coded, thus providing a secondary indicator of selected mode. For example, in the indicators shown in FIG. 11, indicator 1101 is blue, indicator 1102 is green, indicator 1103 is white, indicator 1104 is yellow and indicator 1105 is red. This is but one of numerous ways in which the selected mode can be highlighted to the driver of the vehicle.

In addition to, or instead of, an on-board charging/operational mode selection means, a remote selection means can be employed. The primary advantage of this type of mode selector is that it allows the user to remotely alter the charging/operational mode. For example, while on a trip the user may find that their trip has been extended and that their vehicle will not be used for an extended period of time and as such, would like to change the mode of the vehicle to the Storage Mode, thereby improving battery life. In an alternate example, a user may find that the next day's travel will be much further than normal. In this scenario the user may wish to change from a Battery Life mode to a Max Range mode. Certain types of remote mode selectors would allow the user to change the mode as required, without the need for being in or next to the vehicle.

Figure 12:
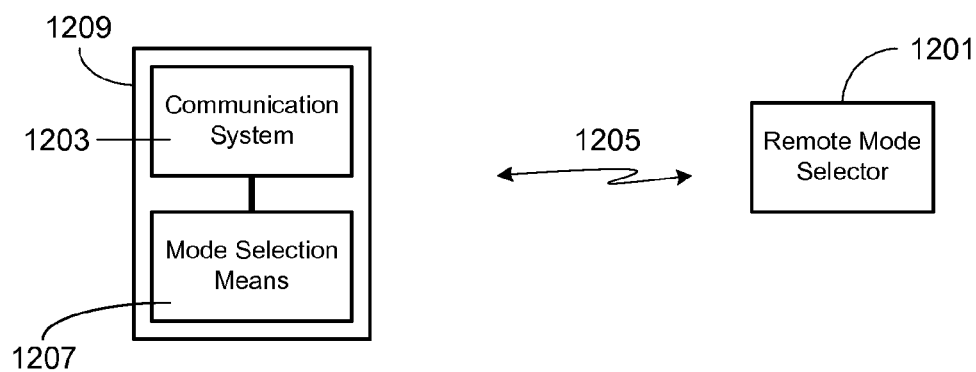
FIG. 12 illustrates a system for remotely selecting the desired charging/operational mode.

FIG. 12 is a simplified illustration of a system for remote charging/operational mode selection. As shown, the system includes a remote mode selector 1201 and an on-board communication system 1203 that communicates with remote mode selector 1201 via communication network 1205. On-board communication system 1203 is coupled to on-board mode selection means 1207, both of which are contained within vehicle 1209. In the simplest form, remote mode selector 1201 is an RF remote, therefore not requiring a communication network. Due to the limited range of an RF remote, in a preferred embodiment remote 1201 communicates via network 1205, network 1205 being any of a variety of known network systems such as cellular, internet, satellite or other. For example, in one embodiment the remote mode selector 1201 is a computer or an application on a cell phone and network 1205 is an internet-based network system. Further descriptions of suitable vehicle communication systems are given in co-assigned U.S. Pat. No. 7,698,078, issued 13 Apr. 2010, the disclosure of which is incorporated herein for any and all purposes.

In at least one embodiment of the invention, the system prompts the user to select a charging/operational mode. For example, in one configuration the user is prompted after turning off the car, but prior to exiting the car, for example when the user first turns the key (or other vehicle on/off control switch) from the operational/driving position to the standby/off position. The user can be prompted by a tone or series of tones, by a pre-recorded or synthesized voice, or by a display means (e.g., flashing indicator, flashing screen on the display interface, etc.), or a combination thereof.

In addition to selecting the desired charging/operational mode, in at least one embodiment the user is also able to set at least some of the parameters employed in the Optimal Battery Life mode. In order to insure that the settings are still useful from the stand-point of optimizing battery life, preferably the user is given a very limited range for any parameter that they are allowed to set. Additionally, while the user may be allowed to set some of the parameters, typically other battery life parameters are set without user input, once the user selects the Optimal Battery Life mode. For example, while the user may be allowed to set SOC levels, charging rates and temperatures may be set in accordance with a preset set of instructions input by the manufacturer or an authorized third party, thus insuring that this mode still achieves its goals of improving battery life.

Figure 13:
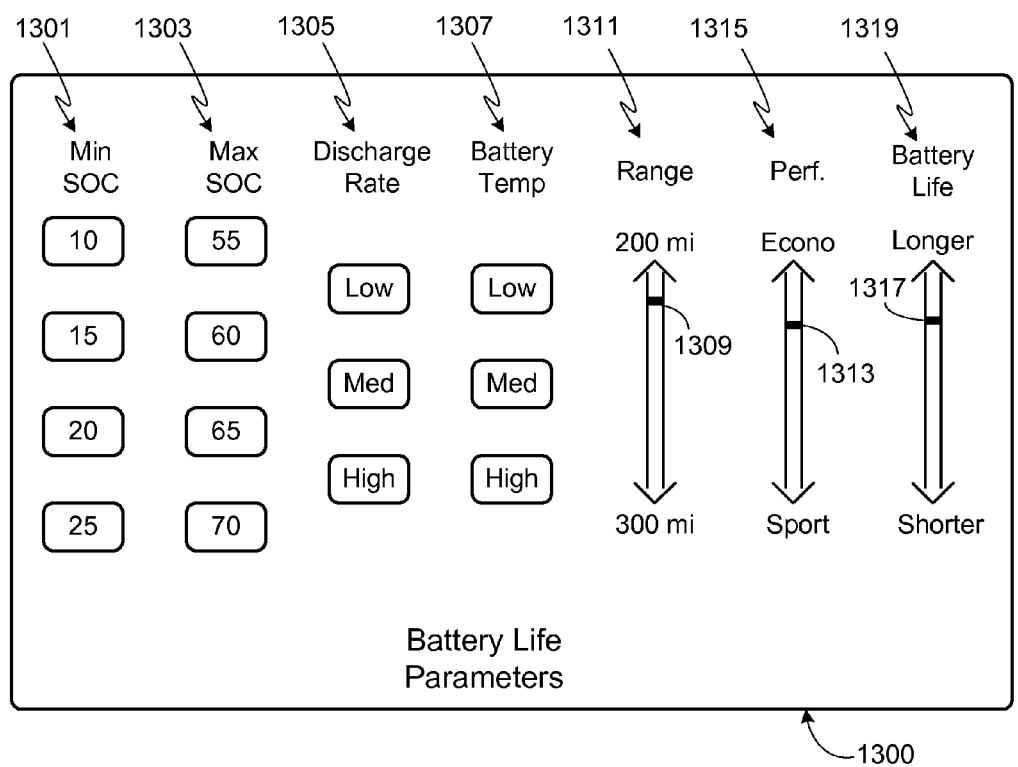
FIG. 13 illustrates a touch screen that may be used to set the preset values for the Optimal Battery Life operational mode.

FIG. 13 illustrates this aspect of the invention, this figure providing an exemplary touch screen 1300 that allows the user to set minimum SOC 1301, maximum SOC 1303, maximum discharge rate 1305 and the battery temperature during discharge 1307. In this example, specific values for some of the parameters can be set by the user (e.g., 1301 and 1303), while other parameters only allow the user to select relative values (e.g., low, medium and high). In the illustrated embodiment, as the user makes a selection an indicator 1309 moves on range scale 1311, thus providing the user with feedback as to how their selection will impact the vehicle's driving range. Similarly, an indicator 1313 shows the impact relative to vehicle performance scale 1315. Lastly, in this example an indicator 1317 shows how the user's selections impact battery life on battery life scale 1319. It should be understood that screen 1300 only represents an exemplary embodiment and that the invention may or may not provide the user with means for setting the parameters applied when the Optimal Battery Life mode is selected; that the means for setting such parameters may include means other than a touch screen (e.g., hard buttons/dials, computer interface, web-based applications, etc.); and that the parameters that may be set in this manner may include a different set of parameters than those illustrated.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

What is claimed is:

1. A multi-mode operating system for an electric vehicle, comprising:
a battery charging system for charging a battery pack of said electric vehicle, wherein said battery charging system charges said battery pack to any of a plurality of maximum and minimum state-of-charge (SOC) levels, and wherein said battery charging system charges said battery pack using any of a plurality of charging rates;
a thermal management system coupled to said battery pack of said electric vehicle, wherein said thermal management system maintains said battery pack to within any of a plurality of temperature ranges;
a vehicle control system coupled to said battery charging system and to said thermal management system; and
means for selecting a vehicle operating mode from a plurality of operational modes controlled by said vehicle control system, wherein said plurality of operational modes includes at least a Battery Life mode and a Standard mode, wherein said selecting means is accessible by a user of said electric vehicle, wherein said Battery Life mode utilizes a first maximum SOC level during battery pack charging that is at least 10% lower than a second maximum SOC level utilized in said Standard mode, wherein said Battery Life mode utilizes a first maximum charge rate and said Standard mode utilizes a second maximum charge rate that is higher than said first maximum charge rate, wherein said Battery Life mode utilizes a first maximum discharge rate and said Standard mode utilizes a second maximum discharge rate that is higher than said first maximum discharge rate.

2. The multi-mode operating system of claim 1, wherein said first maximum SOC level is preset at 60% or less, wherein said first maximum charge rate is preset at C/20 or less, and wherein said first maximum discharge rate is preset at 1C or less.

3. The multi-mode operating system of claim 1, wherein said Battery Life mode utilizes a first minimum SOC level during battery pack charging that is at least 5% higher than a second minimum SOC level utilized in said Standard mode.

4. The multi-mode operating system of claim 1, wherein said Battery Life mode utilizes a first minimum SOC level during battery pack charging that is at least 15% higher than a second minimum SOC level utilized in said Standard mode.

5. The multi-mode operating system of claim 1, wherein said Battery Life mode utilizes a minimum loaded voltage set to a preset level of approximately 3.0 volts.

6. The multi-mode operating system of claim 1, wherein said thermal management system maintains said battery pack during discharge to a first temperature within a first range of temperatures when said Battery Life mode is selected, wherein said thermal management system maintains said battery pack during discharge to a second temperature within a second range of temperatures when said Standard mode is selected, and wherein said first range of temperatures is less than said second range of temperatures.

7. The multi-mode operating system of claim 6, wherein said first range of temperatures is approximately 25° C. to 30° C., and said second range of temperatures is approximately 30° C. to 35° C.

8. The multi-mode operating system of claim 1, further comprising at least one battery pack temperature sensor, wherein said first maximum charge rate utilized when said Battery Life mode is selected depends on a battery pack temperature, wherein said first maximum charge rate is preset at C/20 or less if said battery pack temperature is above 10° C., and wherein said first maximum discharge rate is preset at C/50 or less if said battery pack temperature is below 10° C.

9. The multi-mode operating system of claim 1, wherein during discharge said thermal management system maintains a thermal balance between a plurality of cells comprising said battery pack within a first preset limit when said Battery Life mode is selected and within a second preset limit when said Standard mode is selected, and wherein said first preset limit is less than said second preset limit.

10. The multi-mode operating system of claim 9, wherein said first preset limit is approximately 5° C. and said second preset limit is approximately 10° C.

11. The multi-mode operating system of claim 1, wherein during an extended charging cycle said battery charging system allows said battery pack to self-discharge to a first minimum SOC level prior to re-initiating charging when said Battery Life mode is selected and to a second minimum SOC level prior to re-initiating charging when said Standard mode is selected, wherein said first minimum SOC level is at least 25% less than said second minimum SOC level.

12. The multi-mode operating system of claim 11, wherein said first minimum SOC level is at least 30% less than said first maximum SOC level.

13. The multi-mode operating system of claim 1, wherein said selecting means is comprised of a touch-sensitive screen.

14. The multi-mode operating system of claim 1, wherein said selecting means is comprised of a display system and a plurality of switching means.

15. The multi-mode operating system of claim 14, wherein said switching means are selected from the group consisting of push-buttons, toggle switches, rotating switches and slide switches.

16. The multi-mode operating system of claim 1, wherein said selecting means is comprised of a plurality of switching means.

17. The multi-mode operating system of claim 1, wherein said selecting means is a voice recognition system.

18. The multi-mode operating system of claim 1, further comprising a communication interface in communication with a network, wherein said selecting means is a remote mode selector in communication with said network, wherein said remote mode selector is separate from said electric vehicle.

19. The multi-mode operating system of claim 1, further comprising an RF communication interface, wherein said selecting means is an RF remote mode selector separate from said electric vehicle.

20. The multi-mode operating system of claim 1, further comprising at least one mode indicator, wherein said at least one mode indicator indicates which mode of said plurality of operational modes is selected by said selecting means.

\* \* \* \* \*